2,966,626
United States Patent Office
                                           Patented Dec. 27, 1960

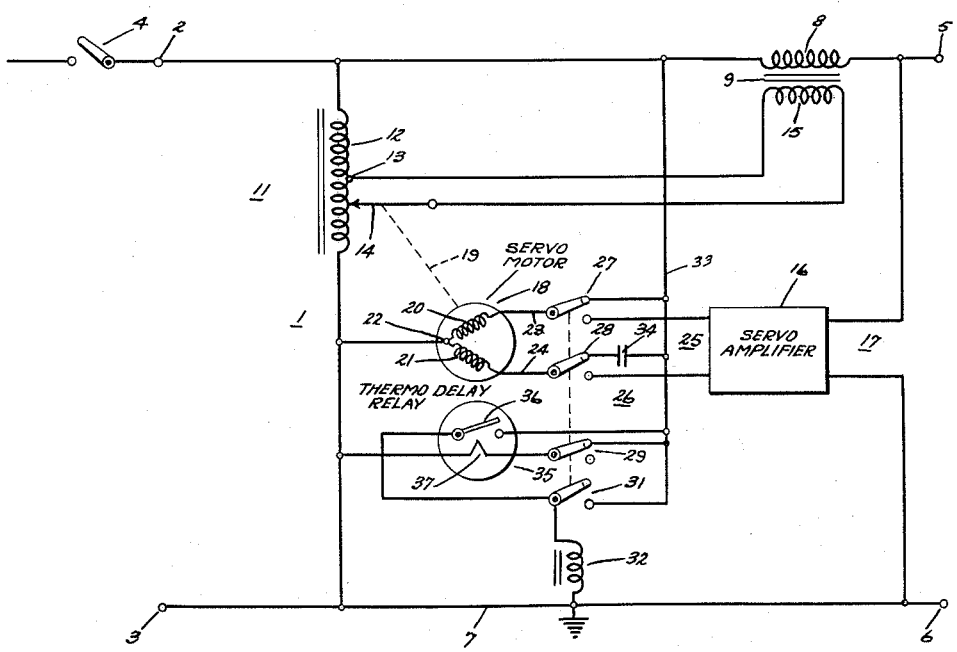

2,966,626

LINE VOLTAGE REGULATOR

Henry A. Kalina and Carlton B. Goss, Fort Wayne, Ind., assignors to International Telephone and Telegraph Corporation Filed Aug. 19, 1959, Ser. No. 834,793

6 Claims. (Cl. 323—45)

This invention relates generally to line voltage regulators of the type incorporating a variable voltage autotransformer coupled across a source of alternating current voltage to be regulated and having a fixed tap and an adjustable tap coupled across the primary winding of a transformer having its secondary winding coupled in series with the line, and having a servo amplifier coupled across the output terminals of the regulator and energizing a servo motor which is operatively connected to drive the adjustable tap of the variable voltage autotransformer, and more particularly to a line voltage regulator of this type incorporating means for preventing an overvoltage output during warmup of the servo amplifier.

In conventional line voltage regulators of the general type described above known to the present applicants, it is possible for an overvoltage output condition to exist for a minute or so after input power has been applied until the servo amplifier warms up sufficiently to assume control of the output voltage; such an overvoltage for this period of time may cause catastrophic failures of equipment connected to the output of the line voltage regulator. It is therefore desirable to provide a line voltage regulator, of the type described above, incorporating means for preventing the possibility of an initial overvoltage output during the warmup time of the servo amplifier.

It is therefore an object of our invention to provide an improved line voltage regulator circuit.

Another object of this invention is to provide an improved line voltage regulator incorporating means for preventing the possibility of initial overvoltage output during warmup time of the servo amplifier.

Our invention, in its broader aspects, provides a line voltage regulator comprising a pair of input terminals for connection to a source of alternating current line voltage to be regulated and a pair of regulated voltage output terminals. Variable voltage means is coupled across the input terminals and has output means for providing a selectively variable voltage. Means are provided coupling the input and output terminals including a serially connected line voltage varying means having means coupled to the variable voltage means for varying the line voltage between minimum and maximum limits responsive to the selectively variable voltage. Means are provided coupled across the output terminals for sensing the output voltage thereacross and for providing an error signal responsive to deviation of the output voltage from a predetermined level. Control means are provided coupled to the variable voltage means for varying the voltage supplied thereby to the line voltage varying means, and means including switching means are provided normally coupling the control means for energization responsive to the line voltage and arranged so that the control means adjusts the output means of the variable voltage means to provide a voltage which causes the line voltage varying means to provide a minimum output voltage. Time delay means are provided coupled for energization responsive to the line voltage and coupled to the switching means for actuating the same to couple the control means to the sensing means for energization thereby after a predetermined time delay.

In the preferred embodiment of our invention, the variable voltage means is a variable voltage autotransformer having its winding coupled across the input terminals and having a fixed tap and an adjustable tap and the line voltage varying means is a transformer having its secondary winding serially connected between an input terminal and an output terminal having its primary winding coupled across the fixed and adjustable tap of the variable voltage autotransformer for bucking or boosting line voltage responsive to the position of the adjustable tap. In the preferred embodiment, the sensing means is a servo amplifier and the control means is a servo motor operatively coupled to the adjustable tap of the autotransformer for operating the same, thereby to vary the voltage applied to the transformer primary winding between maximum bucking and maximum boosting. Further, in the preferred embodiment, the switching means has a first position normally coupling the servo motor for energization from across one of the pairs of terminals and arranged so that the servo motor drives the autotransformer adjustable tap to its maximum line voltage-bucking position, the switching means having a second position coupling the servo motor to the servo amplifier for energization proportional to the error voltage.

The above-mentioned and other features and objects of this invention and the manner of attaining them will become more apparent and the invention itself will be best understood by reference to the following description of an embodiment of the invention taken in conjunction with the accompanying drawing, wherein:

The single figure of the drawing schematically illustrates the preferred embodiment of our improved line voltage regulator.

Referring now to the drawing, our improved line voltage regulator circuit, generally indicated at 1, comprises a pair of input terminals 2 and 3 adapted to be connected to a suitable source (not shown) of single phase alternating current voltage to be regulated; a line switch 4 is shown serially connected with input terminal 2, it being readily understood that any conventional switching means may be provided for connecting and disconnecting voltage regulator circuit 1 from the source of line voltage.

A pair of regulated voltage output terminals 5 and 6 are provided, input terminal 3 and output terminal 6 being directly connected by conductor 7, which may be grounded as shown, and input terminal 2 and output terminal 5 being serially connected by secondary winding 8 of transformer 9. A variable voltage autotransformer 11 is provided having its winding 12 connected across input terminals 2 and 3 as shown. Winding 12 of variable voltage autotransformer 11 has a center tap 13 and an adjustable tap 14 connected across primary winding 15 of transformer 9, as shown.

A conventional servo amplifier 16 is provided having its input circuit 17 coupled across output terminals 5 and 6. A conventional two-phase servo motor 18 is provided operatively coupled to drive adjustable tap 14 of autotransformer 11, as indicated by the dashed line 19. Servo motor 18 is conventionally provided with two field windings 20 and 21, having their ends 22 connected together and to ground, as shown.

In a conventional line voltage regulator of this type, ends 23 and 24 of windings 20 and 21 of servo motor 18 are directly connected to the output circuit of servo amplifier 16. Servo amplifier 16, which may be of any conventional type well known to those skilled in the art, senses the output voltage across output terminals 5 and 6 and provides in its output circuit 25 an error signal responsive to the deviation of the output voltage of regulator 1 from a predetermined level, this error voltage energizing servo motor 18 to drive adjustable tap 14 of autotransformer 11 to apply a voltage on primary winding 15 of line voltage varying transformer 9 to buck or boost the line voltage, as the case may be, in order to restore the output voltage to the predetermined level; the voltage applied to primary winding 15 of transformer 9 induces a voltage in serially connected secondary winding 8 which is either in phase with or in phase opposition to the line voltage. Assuming now that the input line voltage applied to the input terminals 2 and 3 is 10% low, and in response thereto the servo amplifier 16 and servo motor 18 have added an appropriate boosting voltage to primary winding 15 of line voltage varying transformer 9 in order to provide the desired output voltage, if the line switch 4 is opened while the input line voltage is still 10% low, the servo motor 18 and thus the adjustable tap 14 of the variable voltage autotransformer 11 will stay in the position last assumed immediately prior to opening of the line switch 4. Assuming further that the line switch 4 is again closed and that at this time the line voltage has risen to a point where it is 10% high, it will now be seen that with servo motor 18 still in the position it had assumed immediately prior to the last opening of the line switch 4, variable voltage autotransformer 11 is still providing a boosting voltage responsive to a 10% low line voltage and thus the output voltage across output terminals 5 and 6 will be 20% high, e.g., 10% high due to the input voltage and another 10% compensating for the previous 10% undervoltage condition. This initial overvoltage output condition will prevail until the servo amplifier 16 warms up sufficiently so that its error signal energizes servo motor 18 to drive adjustable tap 14 of variable voltage autotransformer 11 to restore the output voltage to the desired level.

In order to prevent the possibility of initial overvoltage output during warmup of the servo amplifier 16, the arrangement now to be described is provided. A relay 26 is provided having contacts 27, 28, 29 and 31 actuated by operating coil 32; the normal condition of the contacts of relay 26, i.e., with operating coil 32 deenergized, is as shown in the drawing. It will now be observed that with line switch 4 open, operating coil 32 of relay 26 will be deenergized so that contact 27 connects end 23 of field winding 20 of servo motor 18 to conductor 33 which in turn is connected to input terminal 2 and that contact 28 connects end 24 of field winding 21 of servo motor 18 through capacitor 34 to conductor 33.

A thermal time delay relay 35 is provided having a normally open thermally actuated contact 36, which may for example be formed of suitable bimetal, and a heater element 37. It will be observed that contact 29 of relay 26 in its normal position, i.e., with operating coil 32 deenergized, connects heater element 37 of thermal delay relay 35 between conductor 7 and conductor 33, and thus effectively across input terminals 2 and 3. Thermal time delay relay 35 is provided with a time delay which is at least as long as the warm up time of servo amplifier 16. It will further be observed that thermally actuated contact 36, when closed responsive to heating by heating element 37 connects cooperating coil 32 of relay 26 between conductor 7 and conductor 33, i.e., across input terminals 2 and 3, and that contact 31 of relay 26 closes when relay operating coil 32 is energized to connect operating coil 32 directly to conductor 33 thus providing an alternate path energizing coil 32 across thermally actuated contact 36 of thermal time delay relay 35. It will finally be seen that contact 29 of relay 26 in its second position, i.e., with operating coil 32 energized, disconnects heating element 37 of thermal time delay relay 35 thereby causing deenergization of the same.

It will now be seen that when line switch 4 is initially closed, field windings 20 and 21 of servo motor 18 are effectively connected across input terminals 2 and 3 with capacitor 34 being connected in series with winding 21 and that servo motor 18 thus initially functions as a split-phase, capacitor start motor. In accordance with our invention, windings 20 and 21 of servo motor 18 are so connected that under these conditions, servo motor 18 drives adjustable tap 14 of variable voltage autotransformer 11 to its maximum bucking voltage end, i.e., to supply maximum bucking voltage to the primary winding 15 of line voltage varying transformer 9 so that the output voltage across output terminals 5 and 6 is immediately reduced to its minimum level. In the meantime, it will be observed that contact 29 of relay 26 connects heater 37 of thermal time delay relay 35 for energization across input terminals 2 and 3, and thus that heater 37 heats the thermally actuated contact 36 so that after a predetermined time delay, at least as long as the warm up time of servo amplifier 16, contact 36 closes thus connecting operating coil 32 of relay 26 for energization across input terminals 2 and 3, thus moving its contacts 27, 28, 29 and 31 to their second positions. It will now be observed that with relay 26 with its operating coil 32 energized, contacts 27 and 28 now connect field windings 20 and 21 of servo motor 18 directly to the output circuit 25 of servo amplifier 16 so that servo motor 18 is now energized responsive to the error voltage provided by servo amplifier 16 and in turn operates adjustable tap 14 of variable voltage autotransformer 11 in a direction to provide the necessary bucking or boosting voltage for the primary winding 15 of transformer 9 in order to provide the desired output voltage across output terminals 5 and 6. Energization of the operating coil 32 of relay 26 opens contact 29 thus deenergizing heater 37 and closes contact 31 providing an alternate path energizing coil 32 so that relay 26 remains energized with contacts 27 and 28 connecting servo motor 18 to servo amplifier 16 so long as line switch 4 is closed. As soon as line switch 4 is opened, however, relay coil 32 of relay 26 is deenergized thus restoring contacts 27, 28, 29 and 31 to their normal positions for the next closing of line switch 4.

It will now be seen that when line switch 4 is closed and prior to warm up of servo amplifier 16, servo motor 18 is connected to the input voltage source causing it to drive the adjustable tap 14 of variable voltage autotransformer 11 to a position yielding minimum output voltage from the regulator and thus that no over-voltage condition can exist prior to warm up of the servo amplifier 16. After normal warm up of the servo amplifier 16, thermal time delay relay 35 energizes operating coil 32 of relay 26, thus switching the servo motor 18 to the servo amplifier 16 for control thereby.

While we have described above the principles of our invention in connection with specific apparatus, it is to be clearly understood that this description is made only by way of example and not as a limitation to the scope of our invention.

What is claimed is:

1. A line voltage regulator comprising: a pair of input terminals for connection to a source of alternating current line voltage to be regulated and a pair of regulated voltage output terminals; variable voltage means coupled across said input terminals and having output means for providing a selectively variable voltage; means coupling said input and output terminals including serially connected line voltage varying means having means coupled to said variable voltage means for varying said line voltage between minimum and maximum limits responsive to said selectively variable voltage; means coupled across said output terminals for sensing the output voltage thereacross and for providing an error signal responsive to the difference of said output voltage from a predetermined level; control means coupled to said variable voltage means for varying the voltage supplied thereby to said line voltage varying means; means including switching means normally coupling said control means for energization responsive to said line voltage and arranged so that said control means adjusts said output means of said variable voltage means to provide a voltage which causes said line voltage varying means to provide a minimum output voltage; and time delay means coupled for energization responsive to said line voltage and coupled to said switching means for actuating the same to couple said control means to said sensing means for energization thereby after a predetermined time delay.

2. A line voltage regulator comprising: a pair of input terminals for connection to a source of alternating current line voltage to be regulated and a pair of regulated voltage output terminals; a variable voltage autotransformer having its winding coupled across said input terminals and having a fixed tap and an adjustable tap; a transformer having its secondary winding serially coupled between one input terminal and one output terminal and having its primary winding coupled across said autotransformer fixed and adjustable taps for bucking or boosting said line voltage responsive to the position of said adjustable tap; the other input terminal being coupled to the other output terminal; a servo amplifier having an input circuit coupled across said output terminals for sensing the output voltage thereacross and having an output circuit for providing an error voltage responsive to the difference of said output voltage from a predetermined level; a servo motor operatively coupled to said autotransformer adjustable tap for operating the same thereby to vary the voltage applied to said transformer primary winding between maximum bucking and maximum boosting, switching means having a first position normally coupling said servo motor for energization from across one of said pair of terminals and arranged so that said servo motor drives said autotransformer adjustable tap to its maximum line voltage buckling position, said switching means having a second position coupling said servo motor to said servo amplifier output circuit for energization proportional to said error voltage; and time delay means coupled for energization from across one of said pair of terminals for actuating said switching means from its normal to its second position a predetermined time after impression of said line voltage on said input terminals.

3. A line voltage regulator comprising: a pair of input terminals for connection to a source of alternating current line voltage to be regulated and a pair of regulated voltage output terminals; a variable voltage autotransformer having its winding coupled across said input terminals and having a fixed tap and an adjustable tap; a transformer having its secondary winding serially coupled between one input terminal and one output terminal and having its primary winding coupled across said autotransformer fixed and adjustable taps for bucking or boosting said line voltage responsive to the position of said adjustable tap; the other input terminal being coupled to the other output terminal; a servo amplifier having an input circuit coupled across said output terminals for sensing the output voltage thereacross and having an output circuit for providing an error voltage responsive to the difference of said output voltage from a predetermined level; a two phase servo motor having two field windings and being operatively coupled to said autotransformer adjustable tap for operating the same thereby to vary the voltage applied to said transformer primary winding between maximum bucking and maximum boosting; phase displacing means; switching means having a first position normally coupling said servo motor field windings for energization from across one of said pair of terminals with said phase displacing means in series with one of said field windings so that said servo motor drives said autotransformer adjustable tap to its maximum line voltage-bucking position, said switching means having a second position coupling said servo motor field windings to said servo amplifier output circuit for energization proportional to said error voltage; and time delay means coupled for energization from across one of said pair of terminals for actuating said switching means from its normal to its second position a predetermined time after impression of said line voltage on said input terminals.

4. A line voltage regulator comprising: a pair of input terminals for connection to a source of alternating current line voltage to be regulated and a pair of regulated voltage output terminals; a variable voltage autotransformer having its winding coupled across said input terminals and having a fixed tap and an adjustable tap; a transformer having its secondary winding serially coupled between one input terminal and one output terminal and having its primary winding coupled across said autotransformer fixed and adjustable taps for bucking or boosting said line voltage responsive to the position of said other output terminal; the other input terminal being connected to the other output terminal; a servo amplifier having an input circuit coupled across said output terminals for sensing the output voltage thereacross and having an output circuit for providing an error voltage responsive to the difference of said output voltage from a predetermined level; a two phase servo motor having two field windings and being operatively coupled to said autotransformer adjustable tap for operating the same thereby to vary the voltage applied to said transformer primary winding between maximum bucking and maximum boosting; phase displacing means; a first relay including contacts having first and second positions and an operating coil, said first relay normally having said contacts in their first position coupling said servo motor field windings for energization from across said input terminals with said phase displacing means in series with one of said field windings so that said servo motor drives said autotransformer adjustable tap to its maximum line voltage-bucking position, said first relay contacts in their second position coupling said servo motor field windings to said servo amplifier output circuit for energization proportional to said error voltage; and time delay relay means coupled for energization from across said input terminals and having a contact coupled to said first relay operating coil for actuating the same to move said first relay contacts from said first to said second positions thereof a predetermined time after impression of said line voltage on said input terminals.

5. A line voltage regulator comprising: a pair of input terminals for connection to a source of alternating current line voltage to be regulated and a pair of regulated voltage output terminals; a variable voltage autotransformer having its winding coupled across said input terminals and having a fixed tap and an adjustable tap; a transformer having its secondary winding serially coupled between one input terminal and one output terminal and having its primary winding coupled across said autotransformer fixed and adjustable taps for bucking or boosting said line voltage responsive to the position of said adjustable tap; the other input terminal being coupled to the other output terminal; a servo amplifier having an input circuit coupled across said output terminals for sensing the output voltage thereacross and having an output circuit for providing an error voltage responsive to the difference of said output voltage from a predetermined level; a two phase servo motor having two field windings and being operatively coupled to said autotransformer adjustable tap for operating the same thereby to vary the voltage applied to said transformer primary winding between maximum bucking and maximum boosting; phase displacing means; a first relay including contacts having first and second positions and an operating coil, said first relay having said contacts in their first position when said operating coil is deenergized and in their second position when said operating coil is energized; said first relay contacts in their first position coupling said servo motor field windings for energization from across said input terminals with said phase displacing means in series with one of said field windings so that said servo motor drives said autotransformer adjustable tap to its maximum line voltage-bucking position, said first relay contacts in their second position coupling said servo motor field windings to said servo amplifier output circuit for energization proportional to said error voltage; and time delay relay means coupled for energization from across said input terminals and having a contact coupling said first relay operating coil for energization from across said input terminals after a predetermined time delay thereby moving said first relay contacts from said first to said second positions thereof a predetermined time after impression of said line voltage on said input terminals.

6. A line voltage regulator comprising: a pair of input terminals for connection to a source of alternating current line voltage to be regulated and a pair of regulated voltage output terminals; a variable voltage autotransformer having its winding coupled across said input terminals and having a fixed tap and an adjustable tap; a transformer having its secondary winding serially coupled between one input terminal and one output terminal and having a primary winding coupled across said atuotransformer fixed and adjustable taps for bucking or boosting said line voltage responsive to the position of said adjustable tap; the other input terminal being coupled to the other output terminal; a servo amplifier having an input circuit coupled across said output terminals for sensing the output voltage thereacross and having an output circuit for providing an error voltage responsive to the difference of said output voltage from a predetermined level; a two phase servo motor having two field windings and being operatively coupled to said autotransformer adjustable tap for operating the same thereby to vary the voltage applied to said transformer primary winding between maximum bucking and maximum boosting; a capacitor; a first relay including at least four contacts having first and second positions and an operating coil, said first relay having said contacts in their first positions when said operating coil is deenergized and in their second positions when said operating coil is energized; two of said first relay contacts in their first positions coupling said servo motor field windings for energization from across said input terminals with said capacitor in series with one of said field windings so that said servo motor drives said autotransformer adjustable tap to its maximum line voltage-bucking position, said two first relay contacts in their second position coupling said motor field windings to said servo amplifier output circuit for energization proportional to said error voltage; and a thermal time delay relay having a normally open, thermally actuated contact and a heater element associated therewith whereby said thermally actuated contact closes after a predetermined time delay responsive to heating by said heater element; a third of said first relay contacts in its first position coupling said heater element for energization from across said input terminals said thermally actuated contact coupling said first realy operating coil for energization from arcoss said input terminals, thereby moving said first relay contacts from said first to said second positions thereof a predetermined time after impression of said line voltage on said input terminals, said third contact in its second position disconnecting said heater element thereby deenergizing the same; the fourth of said first relay contacts in its second position also coupling said first relay operating coil for energization from across said input terminals thereby providing an alternate path for energization of said coil across said thermally actuated contacts.

No references cited.